United States Patent

[11] 3,630,773

[72] Inventor Thomas J. Schoch, deceased
    late of La Grange, Ill. by Lydia W. Schoch, executrix
[21] Appl. No. 718,922
[22] Filed Apr. 4, 1968
[45] Patented Dec. 28, 1971
[73] Assignee CPC International Inc.

[54] CONTINUOUS PROCESS FOR THE EXTRACTION OF STARCH MATERIALS AND PRODUCTS PRODUCED THEREBY
    13 Claims, No Drawings
[52] U.S. Cl................................................... 127/32, 127/70, 127/71
[51] Int. Cl.................................................. C13l 1/08
[50] Field of Search.................................... 127/32, 33, 71, 39, 40, 70

[56] References Cited
    UNITED STATES PATENTS
    2,280,723  4/1942  Schoch........................... 127/71
    2,587,650  3/1952  Rist................................ 127/71

OTHER REFERENCES

Schoch, T. J., " Methods in Carbohydrate Chem.," R. L. Whistler, Ed., IV, 56–59, Academic Press, New York, 1964

Primary Examiner—Joseph Scovronek
Assistant Examiner—Sidney Marantz
Attorneys—Frank E. Robbins, Janet E. Price, Martha A. Michaels, Joseph Shekleton and Dorothy R. Thumler ABSTRACT: Process for the removal from a starch material of substances that are soluble in a hydrophilic fat solvent. One particular kind of substance that can be removed is the normal bound fat. The process involves rapidly heating the granular starch material in intimate contact with an aqueous vehicle comprising a hydrophilic organic fat solvent in a confined treating zone, to a temperature up to about 300° F. and preferably from about 170° to about 260° F., under a pressure that maintains the vehicle essentially in the liquid phase, during a time period at the elevated temperature from about 30 seconds to not more than about 10 minutes, then promptly separating the aqueous vehicle from the extracted starch material. The products have superior gel-forming characteristics and are particularly useful in the manufacture of gum confections, puddings, aspics, and the like.

CONTINUOUS PROCESS FOR THE EXTRACTION OF STARCH MATERIALS AND PRODUCTS PRODUCED THEREBY

This invention relates to processes for treating granular, that is ungelatinized, starch in order to impart unique and improved properties to it.

Prior art processes for purifying starch are available. For example, there are several suggestions in the art for purifying starch by defatting it, or for altering its characteristics, by prolonged extraction treatments in an autoclave. Such treatments have obvious disadvantages for large scale operations.

One object of the present invention is to provide a practical process for the purification of starch materials.

A more specific object of the invention is to provide a practical, continuous process that may be used for reducing the natural fat content of starch to very low levels.

Still another object of the invention is to provide a practical and continuous process by which starch can be treated to remove from the starch certain components that contribute undesirable taste and color characteristics to the starch.

Another object of the invention is to give a dry powdered starch of greatly improved free-flowing qualities, such that it can be readily poured through the orifice of a container.

Another object of the invention is to provide improved starch products through the use of processes of the character described.

Other objects of the invention will be apparent hereinafter from the specification and from the recital of the appended claims.

I have made the surprising discovery that if a suspension of corn or other cereal starch is heated very rapidly, to an elevated temperature, in intimate contact with an appropriate hydrophilic fat solvent, the fatty material dissociates almost immediately from the starch and dissolves almost quantitatively in the solvent medium. The prompt separation of the extracted starch material from the solvent medium yields a substantially fat-free product and prevents readsorption of the fat back into the starch.

Granular starch that is processed, in accordance with the present invention, may be derived from any vegetable source, but the preferred starches are those of cereal origin, although starches of root or tuber origin can also be used. For example, corn, wheat, rice, and grain sorghum, and the waxy starches may be used. The term "starch" is used broadly herein, and encompasses unmodified starch and tailings, and, as well, starch that has been somewhat modified by treatment with acids or oxidizing agents. In addition, starches of higher than normal amylose content may be purified by this treatment, for example, high-amylose pea starches of 55–75 percent amylose content, high-amylose corn starches with amylose contents ranging from about 35 to about 80 percent. Also, amylose prepared by the fractionation of starch can likewise be purified by the processes herein described.

Soluble or partially soluble modified starches, dextrins, pregelatinized products, and starch derivatives are also suitable for use in the process.

The process of the invention is effective for the removal of several different kinds of undesirable noncarbohydrate substances that are naturally or accidentally present in the starch material and that are soluble in the hydrophilic fat solvents employed in practicing the process of the invention. The most important of the noncarbohydrate substances, that can be removed by the process of the present invention, is the lipid material, which may be free fatty acids, as in the case of corn starch, or phospholipid, as with wheat starch, or alkali metal soap, as with commercial rice starch. In addition, the protein content of these cereal starches is substantially reduced by the purification process of the invention, although the extent of removal of protein is generally not as complete as that of the lipid material. It is also an important advantage of the invention that undesirable coloring materials, that is, carotinoids, and, as well, flavoring substances, are reduced or removed, to produce a whiter starch product with concurrent reduction of undesirable, cereallike flavors and odors.

As is known, the amylose-containing cereal starches contain a certain amount of bound fat. This amount is usually in the range from about 0.5 to about 0.8 percent by weight of the starch. Cornstarch, for example, contains about 0.6 percent bound fat. A significant proportion of the natural bound fat can be removed from the starch by the process of the present invention. The products produced in this way, that have a fat content of 0.3 percent or less, provide exceptionally fine congealing agents for use in the manufacture of many different kinds of gelled food products, particularly gum confections such as gumdrops and jellybeans. However, one of the important advantages of the present invention is that it can be employed to provide significant reductions of color and flavor in starch materials that do not contain significant amounts of lipid or proteinaceous material initially. The process of the invention is therefore not confined simply to defatting.

In applying the process of the invention to the several common cereal starches, including corn, sorghum, wheat and rice, the removal of natural lipid material and pigments improves the taste qualities and color of the starch. The application of the process of the invention to the waxy or amylopectin starch varieties, particularly waxy sorghum and waxy maize starches, removes undesirable flavors and odors that are normally associated with these starches. In particular, the cereal or cardboardlike flavors of the untreated waxy starches are removed. While very little is known about the chemical nature of trace impurities that impart undesirable flavors to starches, they are extracted by the process of the present invention, with noticeable improvements in starch quality. In addition, starch materials processed in accordance with the present invention have free flowing characteristics.

When certain chemically modified starches are processed in accordance with the invention, persistent noncarbohydrate impurities, that were introduced during the manufacture of the modified starch, are removed. For example, traces of nauseous amine compounds, that remain in cationic starch derivatives as byproducts of their manufacture, are removed. Other advantages are observed when the process of the invention is applied to the many different commercial modified starches, such as acid-thinned starches and dextrins, oxidized starches, and such chemically derivatized products as cross-bonded starches, and ethers and esters of starch. For example, residual amounts of byproduct glycol and polyglycols are readily removed from hydroxyethyl starch.

When the process of the invention is applied to pregelatinized starches such as roll-dried and spray-dried products, it is desirable to employ substantially anhydrous solvents, or alternatively, to reduce the proportion of water in the solvent vehicle, in order to avoid hydration of the pregelatinized starches and to facilitate processing by avoiding sticky particles that may cause trouble during mechanical operations such as, for example, centrifuging and filtration.

The solvents that are used in the process, to form the main portion of the vehicle in which the starch material is treated, are those that have been recognized in the prior art as useful for the removal of fat from cereal starches by the high-pressure, high-temperature, prolonged exposure time autoclave techniques. The hydrophilic fat solvents ordinarily are certain alkanols and certain ethers. Examples of these materials are methanol, either in the anhydrous form or with added water, ethyl alcohol, 80 percent dioxane, and ethylene glycol monomethyl ether. Of these, methanol is by far the preferred solvent, because of its low cost, low explosive hazard, ease of recovery, and high efficiency for fat extraction.

Ordinarily, for practicing the process, the starch material is suspended in the hydrophilic fat solvent, that is selected for use, by some technique that produces a smooth dispersion. The amount of starch material in the liquid vehicle ordinarily is determined by practical considerations. Low concentrations of starch material are not practical to process, and high concentrations may produce mechanical difficulties in handling. Ordinarily, the upper limit on the starch content of the slurry is about 40 percent by weight. Generally, the proportion of starch material in the slurry will be determined empirically.

While the presence of some moisture in the liquid vehicle is desirable, the preferred slurry composition ordinarily is made up with a liquid vehicle, including any moisture contributed by the starch, that comprises 85 percent by weight of methanol and about 15 percent by weight of water. Commercial starch frequently has from about 10 to about 12 percent by weight of moisture, and this amount should be taken into consideration in calculating the total amount of water present in a slurry. Amounts above about 20 percent by weight of water, based on the total amount of liquid vehicle present, including the moisture derived from the starch itself, ordinarily should be avoided because the efficiency of fat extraction drops off above this figure, and in addition, undesirable effects upon the starch may be observed.

The process of the invention is most advantageously practiced on a continuous basis. A stream of slurry is heated as rapidly as possible to an elevated extraction temperature. Ordinarily, satisfactory results are obtained at temperatures up to about 300° F. A preferred operating range is from about 170° to about 260° F. The heating is accomplished in a confined zone, where the pressure is maintained at a level such that the liquid vehicle of the slurry is maintained essentially in the liquid phase. Prolonged digestion at the elevated temperature is avoided, by prompt separation of the extracted starch material from the solvent vehicle, following the rapid heating step.

Because the impurities go into solution so rapidly, little or no correlation has been observed between the extraction temperature and the time of exposure to this temperature, although it is possible that a correlation may exist. Ordinarily, the least exposure time possible is preferred. For effective defatting of many common starch materials, such as, for example, cornstarch, highly satisfactory removal of lipid material is achieved by flash heating for periods from about 0.5 minutes to about 3 minutes, that is, reductions of fat content to a level in the range from about 0.02 to about 0.10 percent are easily obtained. No useful purpose is accomplished by more prolonged heating. Indeed, heating for prolonged periods, that is, for 15 minutes or more, may cause undesirable degradation of the starch. Thus, if a starch slurry is slowly heated to the elevated extraction temperature, or if the suspension is maintained at the high extraction temperature for an extended period of time, it appears that the lipid material may tend to become more tightly adsorbed by the starch, instead of being extracted. Also, acidity due to the fatty acid may cause hydrolytic degradation of the starch. In addition, temperatures above 300° F. are not only unnecessary and may cause undesirable degradation of the starch, but in addition, tend to create mechanical difficulties such as, for example, the need for high-pressure equipment, and problems in dealing with the liquid vehicle upon its separation from the starch material following the extraction.

Immediately following the flash heating of the starch slurry, the extracted starch material is separated from the liquid vehicle. This can be accomplished in several ways. For example, the hot slurry can be subjected to continuous filtration, under autogenous pressure. Alternatively, a cooling chamber may be introduced into the processing system, to reduce the temperature of the starch slurry to a point below the boiling point of the liquid vehicle at atmospheric pressure, to facilitate handling. The cooled slurry can then be separated by the use of a filter or by the use of a centrifugal separator. One preferred mode for the practice of the invention involves flash cooling of the hot suspension, by its injection into a vessel that is equipped with some kind of condenser for capturing the vaporized solvent. Still another alternative involves the use of a pressure centrifuge, which eliminates the need for cooling in advance of centrifugal separation.

The preferred way for practicing the invention involves passing a stream of the slurry through a tubular heat exchanger, in which the slurry is rapidly brought to the desired extraction temperature, with a minimum exposure time. The slurry is then injected into a flash evaporator, to effect rapid cooling of the slurry to a temperature below the boiling point of the solvent at atmospheric pressure. The starch material is then promptly separated from the liquid vehicle. The liquid vehicle can then be processed, if desired, to separate the extracted materials from the hydrophilic solvent, to permit reuse of the hydrophilic solvent in the process. Such a process ordinarily will expose the starch material to the elevated extraction temperature for a period of time less than about 3 minutes. In any case, it is preferred that the exposure time be less than 10 minutes.

Concurrent with the purification of the starch material, it is possible to effect hydrolytic modification of the starch to a thin boiling product, if desired. Thus, the suspension of starch can be acidified before it is heated to extraction temperature. The heated slurry will then undergo hydrolytic cleavage to provide a thin boiling product, that is, a product that cooks in water to give a thinner paste than the original starch material. Thus in addition to the main objective of obtaining a purified starch of decreased lipid, protein and pigment content, the secondary benefit is obtained of simultaneous acid modification.

After processing the starch material in accordance with the invention, any residual solvent, that remains in the starch material, is removed. Several techniques are available for removing this residual solvent material. If the solvent is a nonedible solvent, such as methanol, and if the starch material is to be used in the preparation of food products, then substantially all of the residual solvent must be removed.

One suitable technique for removing residual methanol or other solvent is as follows. The moisture content of the recovered, extracted starch material is adjusted to not more than about 5 percent, and preferably not more than about 2.5 percent by weight, based on the weight of the starch material; and the total volatiles content is adjusted to not more than about 35 percent by weight, and preferably not more than about 15 percent by weight. This can be accomplished, for example, by first washing the recovered starch with solvent or water, filtering, air drying to a moisture content of about 8 to 12 percent, and finally drying with the application of heat, preferably to a temperature in the range from about 245° to about 275° F., to reduce the moisture level to 5 percent or less and the total volatiles level to not more than 35 percent.

Live steam is then passed through the partially dried starch material. The starch system is maintained throughout at a temperature above the condensation point of the steam. A fluidized bed apparatus is particularly suitable for performing this steam stripping or steam distillation step. By using this technique, the residual solvent can be reduced to less than 50 p.p.m. in less than 60 minutes.

Ordinary starches produced by the process of the invention are thick boiling, and can be used in any application where a starch having exceptionally high gel strength, good purity, improved taste, superior color, and the like are desirable. Starch products produced in accordance with the invention are particularly valuable as congealing agents for food products such as puddings, and the like. However, one of the most useful applications for products made by the process of the invention is in the manufacture of gelled food products such as gum confections. Starches used for this purpose preferably are in thin boiling form, that is, are modified by acid or other means to have paste viscosities within the range from about 30 to about 80 fluidity, as measured by the method of Buel "Eighth International Congress, Pure Applied Chemistry, Orig., Comm., 13, 63 (1912)." Therefore, when starch is processed in accordance with this invention, to produce a product for use in a gum confection, it should also be rendered thin boiling, preferably within the range of 30 to 80 fluidity. This can be done before, during, or after the purification process of the invention.

The following examples illustrate the practice of the invention. All references to parts and percentages are by weight unless expressly stated to be otherwise.

EXAMPLE 1

Defatting Cornstarch

A lot of commercial dry corn starch was found to contain 11.0 percent moisture, 0.56 percent total fat, and 0.30 percent protein. This starch was suspended in anhydrous methanol to make up a 32 percent starch slurry, that is, in the proportion of 1 kilogram of starch for each 4 liters of methanol.

A stream of this suspension was passed through a steam-jacketed stainless steel tube at the rate of 228 liters per hour. The average time of passage through the tube, from one of its ends to the other, was from about 2.4 minutes to about 2.7 minutes. The tube was fitted with a discharge valve for maintaining the suspension under autogenous pressure developed by heating the methanol above its boiling point.

Three separate demonstrations of the invention were conducted, at three different extraction temperatures. The three temperatures were achieved by adjusting the pressure of the steam in the jacket about the heat exchanger tube. Temperatures at the discharge end of the tube were observed, in the three different runs, to be 196°, 243°, and 257° F., respectively.

The suspension was discharged from the heat exchanger tube into an enclosed vessel that was maintained substantially at atmospheric pressure, and that was equipped with a condenser. A portion of the methanol flashed off immediately upon injection into the flash evaporator, to reduce the remainder of the suspension to a temperature below the boiling point of the methanol. The partially cooled suspension was then immediately filtered to separate the extracted starch from the liquid vehicle.

The filter cake was then washed, first with hot condensed methanol from the flash evaporator, then with water. It was finally tray dried.

Protein analyses were then run by the conventional Kjeldahl method, and the fat content was determined by the standard acid hydrolysis procedure, as described in the text, "Methods in Carbohydrate Chemistry," edited by R. L. Whistler, Vol. 4, pages 56–61, Academic Press, New York, 1964. The data relating to these three demonstrations of the invention is summarized below in table 1.

TABLE 1

| Text | Demonstration | | |
|---|---|---|---|
| | 1a | 1b | 1c |
| Extraction temperature, °F | 196 | 243 | 257 |
| Percent fat content of extracted starch | 0.20 | 0.10 | 0.085 |
| Percent protein content of extracted starch | 0.23 | 0.21 | 0.20 |

The process of the invention is very effective for removing fat and significantly effective in reducing protein, as the above data shows. More effective fat removal is achieved, on the basis of the three demonstrations described above, as the extraction temperature is increased. In addition, other observations confirmed that the starch products had improved color and flavor.

EXAMPLE 2

Extraction of Fat from Cornstarch—Effect of Water

A portion of the same commercial, dry cornstarch used in example 1 was used as the starch material for additional demonstrations of the invention. The starch was made up with anhydrous methanol as a 32 percent slurry, as in example 1, but different amounts of water were added to several batches of the suspension, and each batch was then processed separately, following generally the process steps of example 1, to permit an observation of the effect of the water content of the slurry on the efficiency of the extraction of fat from the starch. The data are tabulated below in table 2.

TABLE 2

| Text | Demonstration | | | |
|---|---|---|---|---|
| | 2a | 2b | 2c | 2d |
| Percent water in liquid vehicle (by analysis) | 1.3 | 15.0 | 20.7 | 32.3 |
| Heating temperature, °F | 243 | 210 | 234 | 221 |
| Heating time, minutes | 2.7 | 2.7 | 2.5 | 2.5 |
| Percent fat content of extracted starch | 0.10 | 0.01 | 0.03 | 0.54 |
| Percent protein content of extracted starch | 0.21 | 0.17 | 0.20 | |

The figures for the amount of water in the liquid vehicle reflect the amount of water added to the methanol, and do not include the moisture present in the starch itself.

These demonstrations show that the greatest efficiency of fat removal is obtained when the liquid vehicle contains about 15 percent of water by weight. When the water content of the liquid vehicle was increased to 32 percent, the liquid vehicle no longer functioned as an effective solvent for the lipid material.

EXAMPLE 3

Fat Extraction from Cornstarch—Effect Of Starch-to-Methanol Ratio

The demonstrations that are described in table 3 below were conducted substantially in accordance with the procedure described in example 1, except that the starch-to-methanol proportions were changed. In addition, the final temperature of the slurry in each case, upon discharge from the heat exchange tube, was about 302° F.

TABLE 3

| Text | Demonstration | | |
|---|---|---|---|
| | 3a | 3b | 3c |
| Liters of methanol per kilogram of corn starch | 1.9 | 2.5 | 3.8 |
| Heating time, minutes | 2.3 | 2.1 | 2.0 |
| Percent fat content of extracted starch | 0.03 | 0.03 | 0.05 |
| Percent protein content of extracted starch | 0.20 | 0.20 | 0.20 |

These demonstrations of the process show that highly efficient removal of the lipid material is achieved even when the starch concentration in the suspension is as high as 1.0 kilogram of starch for 1.9 liters of methanol.

In each case, the products were observed to have improved color, improved odor, and superior gelling characteristics when used in the preparation of foods such as gum confections.

EXAMPLE 4

Application of the Process to Wet Starch Filter Cake

Wet filter cake of 60-fluidity, acid-modified corn starch was used as the initial material for this demonstration. The starch was found to contain 0.60 percent fatty acid on a dry starch basis.

To reduce the water content of the filter cake, it was washed with a small amount of methanol, then suspended in anhydrous methanol, to provide a solids content in the range from 35 to 40 percent. An analysis of a filtered sample of the solvent vehicle revealed the water content of the solvent vehicle to be 8.3 percent.

Following the procedure of example 1, the suspension was processed by flash heating to about 250° F. during an initial heating period of 60 seconds. The heated slurry stream was passed through a holding coil, with a transit time of about 120 seconds, and a final discharge temperature from the holding coil of 242° F. The slurry was then discharged into a closed flash evaporator, with a reduction in temperature of the slurry to about 140° F. The residual suspension was immediately filtered. The filter cake was washed with condensed methanol, and the washed cake was found to contain about 30 percent by weight of the residual solvent.

The filter cake was then dried in two stages, first by heating in air, then by heating in hot, moist air in a fluidized bed dryer.

The final fat content of the defatted, 60-fluidity cornstarch was 0.06 percent. It had excellent gelling characteristics for use in gum confections.

EXAMPLE 5

Processing of Waxy Starch

A suspension was prepared of 25 parts by weight of waxy sorghum starch for each 100 parts by weight of anhydrous methanol. The slurry was then processed in accordance with the procedure described in example 1. It was flash heated to 235° F., then rapidly cooled by flash evaporation, filtered, and dried. In a first demonstration of the invention, the heating period was 2.5 minutes. In a second demonstration of the invention, the heating period was 5 minutes.

The two extracted starch products, in dry powdered form, were observed to be substantially whiter in appearance than the untreated starch. The original, untreated starch produced a cooked paste having a distinctly "cereal" odor and "cardboardy" flavor. By way of comparison, the two purified starches were almost tasteless and odorless.

A portion of the original starch was cooked in water to give a 6 percent paste. This paste was cloudy in appearance, and had a light transmission of 23 percent, as measured photometrically (water = 100 percent transmission). Similar pastes were made up from the two purified starches, and were much clearer in appearance, with light transmission measurements of 57 and 55 percent, respectively.

The insoluble residue, after enzyme conversion of cooked starch paste, is referred to in the trade as sludge. For the original waxy sorghum starch, the observed sludge was 0.22 percent. For each of the starches that were purified in accordance with this example, the sludge level was 0.05 percent.

The demonstration in which the extraction period was 5 minutes produced a starch that was not significantly better in any respect than the demonstration in which the starch was extracted for only 2.5 minutes. It is therefore apparent that the undesirable impurities, that cause undesirable odor, color, flavor, and the like, are immediately removed from the starch by the process of the present invention, and do not require a prolonged extraction time.

EXAMPLE 6

Simultaneous Purification and Acid Modification

A 35 percent dispersion of cornstarch in methanol, containing 15 percent by weight of water in the liquid vehicle, was adjusted to a pH of 2.5 with hydrochloric acid. The dispersion was then processed as in example 1, at an extraction temperature of 250° F., with a total heating time of 2.5 minutes. The hot suspension was cooled by flash evaporation, and the starch was then removed from the suspension by filtration, and dried.

The fat content of the starch was reduced by this treatment from an original level of 0.60 to 0.05 percent. In addition, the starch was rendered thin boiling, that is, it produced cooked pastes of much lower viscosity than the original starch.

CONCLUSION

While the above examples describe demonstrations of the invention in which methanol was employed, comparable results are obtained when other hydrophilic fat solvents are used.

In the conventional method of preparing gum confections such as gumdrops, a mixture of thin boiling starch, a sugar solution such as sucrose, water, and corn syrup is cooked. Flavor and coloring are then added, and the mixture is deposited in depressions in trays covered with dry powdered molding starch. The trays are then stored in conditioning rooms for a period of time up to about 3 days, during which the candies gradually set up to firm gels that can be removed from their molds, then sanded, that is, coated with sugar, and packaged.

When conventional thin boiling starches are used, the gumdrops ordinarily require a conditioning period of at least 24 hours before they can be removed from their molds without loss of shape, and require an additional period of time up to about 48 hours before they are sufficiently firm to permit sanding.

By way of contrast, when starches that have been processed in accordance with the present invention are used as congealing agents for gum confections, the need for drying rooms is completely eliminated. At ordinary room temperature, within about 30 minutes or less following the cooking operation, the candies are firm enough to be removed from their molds, and are strong enough to be sanded within 45 or 60 minutes after cooking. This highly advantageous result is achieved without any need for alteration in the process or formulation for the preparation of the gum confections.

Confections prepared with starches processed in accordance with the present invention are comparable to those prepared with costly fruit pectin, in that they exhibit exceptional clarity and brilliance, and have little or no undesirable "cereal" taste. They are further characterized by excellent resilience. That is, when such gum confections are subjected to pressure, they will deform without cracking, and when the pressure is removed, they rapidly resume their former size and shape.

One satisfactory procedure, for making gumdrops with a purified starch, is as follows. A mixture is made of one pound of the purified starch, 4 lb. 9 oz. of corn syrup, 3 lb. of sucrose, and 1 lb. 1.5 oz. of water. This mixture is preheated, preferably to about 225° F., and then cooked at about 265° F. The preferred cooking technique involves passing the mixture through a steam injection cooker. The hot mixture is spooned into starch molds and held at room temperature for not more than an hour. When the starch has been purified sufficiently to reduce its fat content to 0.30 percent by weight, or preferably less, a gumdrop made in this way ordinarily has sufficient strength after 45 minutes at room temperature to permit sanding.

The purified starches produced in accordance with this invention form excellent materials for making puddings. For example, excellent puddings may be prepared from the following recipe:

| Ingredients | Parts by Weight |
| --- | --- |
| Starch, dry basis | 13.0 |
| Sucrose | 36.2 |
| Dextrose | 9.0 |
| Salt | 0.3 |
| Flavoring | 0.17 |
| Color | 0.5 |
| Whole milk | 245 |

A mixture of these ingredients, cooked over boiling water for about 7 minutes, and then poured into serving dishes and cooled, provides puddings of excellent characteristics. The gel strength of puddings made with starches produced by the process of the present invention are substantially higher than those prepared from ordinary starch. In addition, they have improved flavor, probably because the purification process of the invention removes proteinaceous and lipid materials, together with other trace substances of unknown constitution which impair the bland flavor of the starch.

The use of starches that have been purified by the process of the present invention, in the preparation of puddings, permits the use of up to 10 percent less starch than is necessary where ordinary starches are employed, to produce puddings of comparable gel strengths.

While several advantages of the process of the present invention have been described, probably the most important are that the process can be practiced on a continuous basis, and is therefore highly adaptable and useful for practical manufacturing operations, and in addition, is an exceptionally rapid process, permitting the achievement of the desired results with modest economic costs. The invention is applicable to any granular starch. The benefits to be realized from the practice of the invention depend on the nature and amount of solvent-soluble, noncarbohydrate impurities in the starch. A continuous purification operation, in accordance with the present invention, involves the exposure of the starch material to a hot, hydrophilic fat solvent for a very brief period of time, under carefully controlled conditions that keep the fat solvent in the liquid phase, even though the slurry is exposed to a temperature at which the liquid vehicle would vaporize under atmospheric pressure. The short exposure, hot extraction is followed by prompt separation of the extracted starch material from the liquid vehicle.

The process of the present invention is particularly useful for defatting starch, and makes possible practical and effective fat extractions during extremely short processing times, on a continuous basis.

The alcohols are the most effective fat solvents. The alcohols that are preferred for use are the lower alkanols. These are effective for extracting 90 percent or more of the bound fat from most starches. Ethylene glycol monomethyl ether is effective for extracting up to about 82 percent of the bound fat from starch under the same conditions where the lower alkanols will extract 90 percent or more of the bound fat. Generally, about one-third of the initial protein is extracted during an effective fat extraction.

One of the advantages of extracting fat in accordance with the present invention is that there is no extensive damage to the starch granules. The free water in the granular starch, and in the liquid vehicle employed in making up the slurry, apparently is held in solution and is not utilized in gelatinizing the starch.

To avoid the granule damage, the water content of the liquid vehicle should not exceed 20 percent by weight based on the weight of the vehicle. A preferred liquid vehicle is 85 percent methanol, the balance being water. One advantage of avoiding granule swelling is that a portion of the methanol can be removed from the filter cake, if desired, by washing with water. Another advantage of avoiding swelling is that subsequent dispersion and cooking of the treated starch is facilitated. In addition, retrogradation of the linear fraction within the granule is avoided.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

It is claimed:

1. A continuous process for the removal from a starch material of substances that are soluble in an organic liquid, comprising:
suspending the starch material in a liquid vehicle comprising an organic liquid that is a hydrophilic fat solvent, to form a slurry;
passing a stream of the slurry through a confined treating zone and rapidly heating the slurry stream during its passage through said zone to a temperature above the normal boiling point of the organic liquid, but under a pressure at which the liquid remains primarily in the liquid phase, the exposure time to said temperature being from about 30 seconds to not more than about 10 minutes, then
promptly separating the extracted starch material from the liquid vehicle.

2. A process in accordance with claim 1 wherein the organic liquid is methanol.

3. A process in accordance with claim 1 wherein the temperature in the treating zone is from about 170° to about 300° F.

4. A process in accordance with claim 1 including rapidly cooling the heated slurry prior to separating the extracted starch material from the liquid vehicle.

5. A process in accordance with claim 1 wherein the liquid vehicle includes a mineral acid, to produce, as a result of the practice of the process, a thin boiling starch material in ungelatinized form.

6. A process in accordance with claim 1 wherein the vehicle contains not more than about 20 percent of water by weight based on the weight of the vehicle.

7. A continuous process for the removal from a granular starch material of substances that are soluble in a hydrophilic fat solvent, comprising:
suspending the granular starch material in an aqueous vehicle comprising methanol, to form a slurry containing not more than about 20 percent water by weight of the vehicle;
passing a stream of said slurry through a confined treating zone;
rapidly heating said slurry stream in said zone during a time period from about 30 seconds to not more than about 10 minutes, to a temperature in the range from the boiling point of the methanol component of the slurry at atmospheric pressure to about 300° F., but under pressure that maintains the methanol essentially in the liquid phase, then promptly
separating the aqueous vehicle from the extracted starch material.

8. Granular starch that is characterized by a bound fat content of not greater than 0.30 percent by weight, prepared in accordance with the process of claim 7, and having free flowing characteristics.

9. A process in accordance with claim 7 including the step of rapidly cooling the slurry to a temperature below the boiling point of the vehicle at atmospheric pressure, before separating the vehicle from the extracted starch material.

10. A process in accordance with claim 7, wherein the aqueous vehicle contains an acid, to produce a thin boiling extracted starch.

11. A process in accordance with claim 7, wherein the granular starch material is granular cornstarch.

12. A process in accordance with claim 7, wherein the fat content of the extracted starch product is less than about 0.30 percent by weight of the extracted starch, dry substance basis.

13. A process in accordance with claim 7, wherein the temperature, to which the slurry stream is heated, is in the range from about 170° F. to about 260° F.

* * * * *